(12) United States Patent
Henderson, Jr. et al.

(10) Patent No.: US 8,453,041 B2
(45) Date of Patent: *May 28, 2013

(54) OBSCURING INFORMATION IN MESSAGES USING COMPRESSION WITH SITE-SPECIFIC PREBUILT DICTIONARY

(75) Inventors: Roderick C. Henderson, Jr., Apex, NC (US); John R. Hind, Raleigh, NC (US); Belinda Y. Langner, Cary, NC (US); Yongcheng Li, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,592

(22) Filed: Mar. 4, 2012

(65) Prior Publication Data

US 2012/0167227 A1 Jun. 28, 2012

Related U.S. Application Data

(63) Continuation of application No. 12/613,231, filed on Nov. 5, 2009.

(51) Int. Cl.
*G06F 11/00* (2006.01)

(52) U.S. Cl.
USPC .............................................. 714/799; 341/51

(58) Field of Classification Search
USPC ............. 714/774, 799, 807; 380/269; 726/26, 726/27; 713/189; 341/51
See application file for complete search history.

(56) References Cited

U.S. PATENT DOCUMENTS

| | | | |
|---|---|---|---|
| 5,608,396 A * | 3/1997 | Cheng et al. .................... | 341/50 |
| 5,953,503 A | 9/1999 | Mitzenmacher et al. | |
| 6,434,561 B1 | 8/2002 | Durst et al. | |
| 6,643,815 B1 | 11/2003 | Davis et al. | |
| 6,683,547 B2 | 1/2004 | Border et al. | |
| 7,013,289 B2 | 3/2006 | Horn et al. | |

(Continued)

FOREIGN PATENT DOCUMENTS

CN 101192217 6/2008

OTHER PUBLICATIONS

P. Skibinski, S. Grabowski, and S. Deorowicz; "Revisiting dictionary-based compression;" published online in Wiley InterScience (www.interscience.wiley.com); DOI: 10.1002/spe.678; http://onlinelibrary.wiley.com/doi/10.1002/spe.678/pdf ; Jul. 29, 2005; Software-Practice and Experience (SP&E) 2005; 35: pp. 1455-1476.*

(Continued)

*Primary Examiner* — Scott Baderman
*Assistant Examiner* — Joseph Kudirka
(74) *Attorney, Agent, or Firm* — Marcia L. Doubet (57) ABSTRACT

Obscuring information in messages to be exchanged over a communications network. In one aspect, the information comprises path name information and parameters for use in a Uniform Resource Locator ("URL"). In another aspect, the information comprises links and parameters used in forms, where hidden parameters are removed from a form and used as URL parameters. A compression dictionary is used to create a compressed form of the information. An identifier of the dictionary and an error detection code (such as a checksum) computed over the compressed information are concatenated with the compressed information, and this is encoded for sending on an outbound message. The original information is then recovered from an inbound message which contains the obscured information by reversing the processing used for the obscuring.

9 Claims, 6 Drawing Sheets

U.S. PATENT DOCUMENTS

| | | | |
|---|---|---|---|
| 7,102,552 B1 * | 9/2006 | Archbold et al. | 341/87 |
| 7,307,552 B2 * | 12/2007 | Ma et al. | 341/51 |
| 7,358,874 B2 * | 4/2008 | Archbold et al. | 341/106 |
| 7,934,105 B1 | 4/2011 | Buckingham et al. | |
| 8,341,501 B2 * | 12/2012 | Franceschini et al. | 714/774 |
| 2003/0030575 A1 * | 2/2003 | Frachtenberg et al. | 341/51 |
| 2003/0037232 A1 | 2/2003 | Bailiff | |
| 2003/0097474 A1 * | 5/2003 | Defosse et al. | 709/246 |
| 2004/0199762 A1 | 10/2004 | Carlson et al. | |
| 2008/0267217 A1 * | 10/2008 | Colville et al. | 370/477 |
| 2008/0307044 A1 | 12/2008 | Musson | |
| 2011/0060997 A1 | 3/2011 | Scoda | |
| 2011/0107077 A1 | 5/2011 | Henderson, Jr. et al. | |
| 2011/0107190 A1 | 5/2011 | Henderson, Jr. et al. | |

OTHER PUBLICATIONS

Roderick C. Henderson et al., U.S. Appl. No. 12/613,231, filed Nov. 5, 2009, Office Action, Apr. 5, 2012, 15 pages.

Roderick C. Henderson et al., U.S. Appl. No. 12/650,039, filed Dec. 30, 2009, Office Action, May 8, 2012, 12 pages.

Song, C. et al., "Information-Hiding URLs for Easier Website Evolution," paper appearing in 8th IEEE Intl. Symp. on Web Site Evolution, WSE '06, Sep. 23-24, 2006, pp. 95-102.

Itokawa, Y. et al., "Dictionary-Based Compression Algorithms for Tree Structured Data," IMECS 2009, Mar. 18-20, 2009, vol. I and II, pp. 580-585.

Leyden, John, "Scotland's oldest newspaper exposes readers' smalls in public; URL manipulation snafu gives access to other users", posted in Security, Sep. 2, 2008, printed from http://www.theregister.co.uk/2008/09/02/scots_paper_privacy_snafu/ on Nov. 5, 2009.

Roderick C. Henderson et al., U.S. Appl. No. 12/650,039, filed Dec. 30, 2009, Office Action, Jan. 6, 2012, 9 pages.

Roderick C. Henderson et al., U.S. Appl. No. 12/613,231, filed Nov. 5, 2009, Office Action, Aug. 17, 2012, 28 pages.

Roderick C. Henderson et al., U.S. Appl. No. 12/613,231, filed Nov. 5, 2009, Office Action, Oct. 26, 2012, 30 pages.

Roderick C. Henderson et al., U.S. Appl. No. 12/650,039, filed Dec. 30, 2009, Office Action, Oct. 16, 2012, 12 pages.

* cited by examiner

```
<html>
<head>
<title>Sample Page</title>
</head>
<body>
<form name="sampleForm"
      action="http://abcdef.com/some/path/application/formProcessor.cgi"
      method="POST">
  <input type="text" size="12" value="Enter text">
  <input type="hidden" name="Language" value="English">
</form>
</body>
</html>
```

410 — form block
420 — form tag
431 — text input
432 — hidden input
433 — value="English"
430 — </form>

OBSCURING INFORMATION IN MESSAGES USING COMPRESSION WITH SITE-SPECIFIC PREBUILT DICTIONARY

BACKGROUND OF THE INVENTION

The present invention relates to computing environments, and deals more particularly with techniques for obscuring information in messages to be exchanged over a communications network. In one aspect, the information comprises path name information and parameters for use in a Uniform Resource Locator ("URL"). In another aspect, the information comprises parameters used in forms.

Messages exchanged over a communications network such as the Internet commonly contain a URL. As is well known, a URL is a subset of a Uniform Resource Identifier ("URI") that specifies where a particular resource is located and a mechanism for retrieving it. The format of a URL is well known, and typically includes a host name and domain portion followed by a path name portion. A so-called "dynamic" form of URL is known, where the URL format provides for passing a string of one or more parameters, where each parameter comprises a name/value pair. The presence of the parameter string is denoted in the URL by specifying a question mark character, and the parameter string then follows this character. Within the parameter string, the name/value pairs are separated from one another by an ampersand character and an equal sign is used to separate the parameter name from the parameter value in each name/value pair.

There have been multiple cases of hacking web sites by modifying dynamic URL parameters, allowing the hackers to discover private data, corrupt the back-end application, and/or corrupt the data used by the back-end application. In one known security breach, for example, a URL included a parameter name/value pair for specifying a user's key for registered users of a web site to thereby pass this key value to the back-end application. Hackers discovered that by modifying the user key value, they were able to view name and address information of the user associated with the altered key value.

BRIEF SUMMARY OF THE INVENTION

The present invention is directed to obscuring information in an outbound message prior to sending the message, and then subsequently restoring the information upon receipt of a corresponding inbound message. Obscuring information in messages preferably comprises: replacing at least one substring of information from an outbound message with a corresponding entry from a compression dictionary, thereby creating a compressed version of the information; computing an error detection code over the compressed version; concatenating an identifier of the compression dictionary, the error detection code, and the compressed version, thereby creating a concatenated string; and appending an encoding of the concatenated string to location information identifying an intended recipient for processing the obscured information, thereby creating an obscured version of the outbound message in which the information is recoverable upon subsequently receiving an inbound message containing the obscured information. The compression dictionary is preferably prebuilt by analyzing log data of the intended recipient, and preferably comprises a sliding window of symbols representing substrings found in the log data by the analyzing (where the substrings found in the log data may be ordered from least-often-used to most-often-used when prebuilding the compression dictionary). Lempel-Ziv compression is preferably used.

In one aspect, the information to be obscured comprises a path segment and parameter string of a Uniform Resource Locator. In another embodiment, the information to be obscured comprises hidden input fields and links embedded in a form of a markup language document. Recovering the information upon subsequently receiving the inbound message containing the obscured information preferably further comprises: separating the encoding of the concatenated string from the location information identifying the intended recipient for processing the obscured information; recovering the concatenated string from the encoding; obtaining the identifier of the compression dictionary, the error detection code computed over the compressed version, and the compressed version from the recovered concatenated string; using the identifier to locate the compression dictionary; using the located compression dictionary to recover, from the compressed version, the replaced substrings of information, thereby creating a recovered version of the information; computing a new error detection code over the recovered version of the information; and using the recovered version of the information only if the computed new error detection code matches the error detection code obtained from the recovered concatenated string.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Various tools have been developed to create an environment where browser users can rather easily modify parameter values in URLs. One example of such tools is the "Tamper Data" tool provided as a plug-in extension for Firefox® browsers. ("Firefox" is a registered trademark of the Mozilla Foundation in the United States, other countries, or both.) While there may be valid reasons for allowing users to modify the parameter values, access to the parameters may provide hackers with an ability to discover sensitive data and/or modify parameter values maliciously. Ideally, back-end applications thoroughly validate all input parameters to avoid use of corrupted input values, and keep all state information in a host database to avoid passing state information back and forth on messages (for example, by passing an identifier of a data structure in which the state information is stored). This is not always accomplished, however. For example, this approach may prevent users from being able to keep and/or share bookmarks to a site because the stored information may be session-specific and therefore not readily reusable.

Embodiments of the present invention are directed toward obscuring information to be sent in outbound messages, thereby preventing hackers from being able to modify or access the information. In one aspect, the information to be obscured comprises path name information and parameters to be exchanged in a URL. (The term "parameter", as used herein, refers to a parameter name/value pair—that is, the parameter name and the parameter value—unless stated otherwise.) In another aspect, the information to be obscured comprises parameters to be passed in forms. Techniques disclosed herein enable obscuring path name and parameter information from the browser, thereby preventing users from viewing or modifying this information. These techniques may be implemented, for example, at a site's edge proxy or web server, without disrupting operating of the web application.

One known approach to preventing URL parameter hacking is to replace the original URL on outbound messages with what is termed a "tiny URL", which is a reference to a database element where the original URL is stored. When the tiny URL is received back at the sender on a corresponding inbound message, it is used as a look-up key to this database to retrieve the original URL. The original URL is then substituted for the tiny URL for processing the inbound message at the message receiver. Because it remains possible to hack the tiny URL, a checksum may be included in the tiny URL on the outbound message to enable validating whether the correct original URL is retrieved from the database for processing the inbound message. Unfortunately, there is no clear way to determine when an entry can safely be removed from this database, as removing an entry that is still being referenced in tiny URLs (which may, for example, be stored as bookmarks on user systems) will cause the tiny URL to become invalid. And because the entry referenced by a tiny URL cannot be safely removed from the database, the database size tends to continually grow.

Parameters can also be passed to a web application using forms, as will be discussed in more detail below. The present inventors are not aware of any attempts to apply the tiny URL technique to parameters encoded in forms.

Another known approach to preventing URL parameter hacking is to place all state information in a session object which is identified by a cookie. The cookie is then passed between communicating partners on messages, and the session object can then be retrieved locally using information from the cookie. This approach does not allow bookmarking of URLs, however, and because bookmarking is a feature most users have come to expect, its absence can lead to user dissatisfaction.

In addition to the security exposures which may occur when transmitting parameters in the clear, security exposures may also occur in the prior art when path name information is exposed on a transmitted URL. For example, if the path name is specified as "/root/user_accounts", this provides information about the directory structure on the target server which may be useful to a hacker who is attempting to gain access to the stored data.

Aspects of the present invention preferably use Lempel-Ziv compression and decompression for obscuring information transmitted in messages (although this is by way of illustration and not of limitation). Lempel-Ziv compression is a known technique whereby a compression algorithm converts strings of characters to shorter strings, and a corresponding decompression algorithm reverses the process. A number of variations of Lempel-Ziv compression algorithms have been developed. A Lempel-Ziv compression algorithm known in the art as "LZ77", along with derivatives thereof such as "LZSS", use a dictionary which is a sliding window containing some number "N" of the most-recent symbols encoded and decoded. A compression algorithm converts an input string into a dictionary offset and string length, and the corresponding decompression algorithm uses this information to retrieve the original input string. For example, a string "ABCDEFGHI" might be entered in the dictionary, and rather than transmitting this 9-character string in messages, a dictionary offset/length value referring to the string can be transmitted to save space. In practice, a substring of characters from an input string are used, rather than attempting to store a string of arbitrary length in the dictionary. When a substring to be compressed is not found in the dictionary, the LZ77 algorithm and its derivatives add the substring to the end of the dictionary. If this causes the dictionary to become full, based on the predetermined size of the sliding window, then the window is shifted to contain the new string (thus causing one or more dictionary entries to slide off the front of the window).

Embodiments of the present invention provide a URL filtering process that leverages the sliding window dictionary concept for obscuring information to be exchanged in messages using a Lempel-Ziv algorithm where the dictionary has been prebuilt for a particular web site by scanning a log that stores information about recent accesses to the web site. The number of log entries to use when prebuilding a dictionary may vary, and may depend on access patterns of an individual web site. For example, if accesses to a particular web site repeatedly use the same path name information, this information may be deduced from scanning the log and the path name information may then be stored as a dictionary entry. Similarly, parameter names may be used repeatedly when accessing the web site, and these parameter names may be stored as dictionary entries. Accordingly, an embodiment of the present invention flexibly adapts to site-specific usage patterns, including an ability to change the amount of log data analyzed for a particular site when the site's usage patterns change. A finite number of dictionaries is preferably used, where the number may be determined based on site optimization.

By way of illustration but not of limitation, discussions herein refer to mining one week's worth of log entries to obtain representative access information sufficient for determining repetitive patterns, and thus the dictionary is described herein as being built from one week's work of log entries.

When compressing information for an outbound URL, such as the path name and explicit parameters, an aspect of the URL filtering process disclosed herein compares the path name and parameter string to the prebuilt dictionary to find substrings which can be compressed; inbound URLs are then decompressed using the same dictionary which was used for compressing the corresponding outbound URL. (As used herein, the term "corresponding" represents the relationship between a compressed URL sent in an outbound message and that same compressed URL when it is subsequently being returned in an inbound message.) In this manner, the path name and parameters are not transmitted in the clear, thereby improving security.

Techniques disclosed herein may also, or alternatively, be used with information embedded in forms encoded in a markup language document such as HTML document used for displaying a web page. Forms may contain a number of form fields, including hidden fields. When processing forms, an aspect of the URL filtering process disclosed herein removes the hidden fields and adds them as a parameter string for the outbound URL prior to compressing the URL and sending the URL responsive to the "submit" action in the form. Links specified in a web page are also removed and obscured.

In one embodiment, the present invention uses a compression dictionary of 4,096 symbols (where "symbol" refers to a single character, number, or special character which can represented using an analogous amount of storage). In this embodiment, a 2-byte or equivalently, 16-bit, value is used for the dictionary offset and the length of the dictionary entry. Of these 16 bits, 4 bits are used for the length and 12 bits are used for the offset. Notably, a 12-bit offset value can encode offsets from 0 to 4,095, thus corresponding to the 4,096 symbol size of the dictionary. Studies on efficiency of compression techniques have determined that it is inefficient to compress strings of 2 characters or less, because when 2 bytes are required for recording the offset and length values, no storage is saved as compared to storing the uncompressed data. Accordingly, whereas 4 bits can represent values from 0 through 15, an offset of 3 is added to these values in the compression algorithm to reflect the fact that the strings in the dictionary are at least 3 characters long. For example, a 4-bit length value of "0000"B indicates a string of length 3 (computed as 0+3), whereas a 4-bit length value of "1111"B represents a string of length 18 (computed as 15+3). Accordingly, the minimum length of a string entered in the dictionary is 3 (i.e., 3 symbols) and the maximum length of a string entered in the dictionary is 18.

Figure 1:
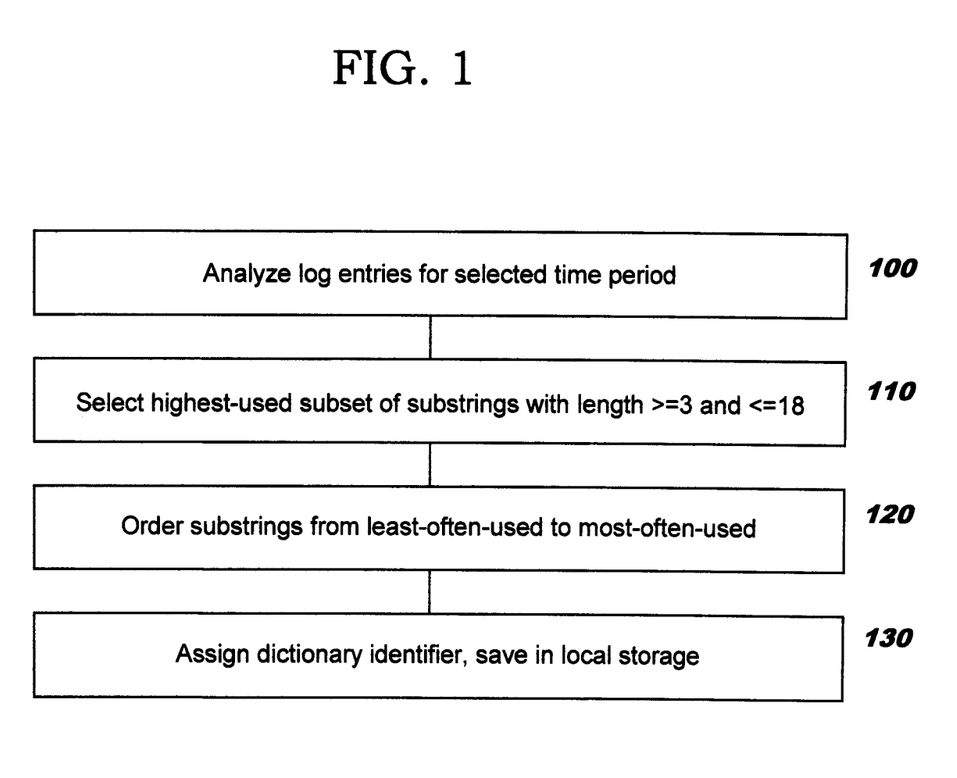
FIG. 1 depicts logic which may be used when building a dictionary for use with the present invention.

FIG. 1 depicts logic which may be used when building a dictionary for use with the present invention. The appropriate log is analyzed with data mining techniques, using the log entries for a selected time period (Block 100). As mentioned earlier, this time period may be 1 week, by way of example, and the log to be analyzed is a site/server log recording access patterns for a web site. The dictionary entries are built by mining the site/server log to select the highest-used subset (i.e., most-often repeated) of substrings with length of at least 3 symbols and not more than 18 symbols (Block 110). Repetition in path segments and parameter names preferably takes precedence over repetition in parameter values. Note that the entries which are mined in the server logs contain data corresponding to the recovered data from obscured URLs, and not the raw server logs which record what came in over the network (which would represent as-compressed data that is unlikely to exhibit useful repetitive substrings).

When the substrings have been selected from the analyzed log data, those substrings are preferably ordered such that the least-used substrings are assigned the lowest offset values within the dictionary and the most-used are assigned the highest offset values (Block 120). In this manner, the most-often-used substrings will take longest to slide out of the sliding window if the dictionary overflows. The dictionary is assigned a dictionary identifier and saved in local storage (Block 130). The dictionary is then ready for use with the URL filtering process disclosed herein for compressing and decompressing operations—that is, for obscuring URLs and subsequently recovering those URLs.

Figure 2:
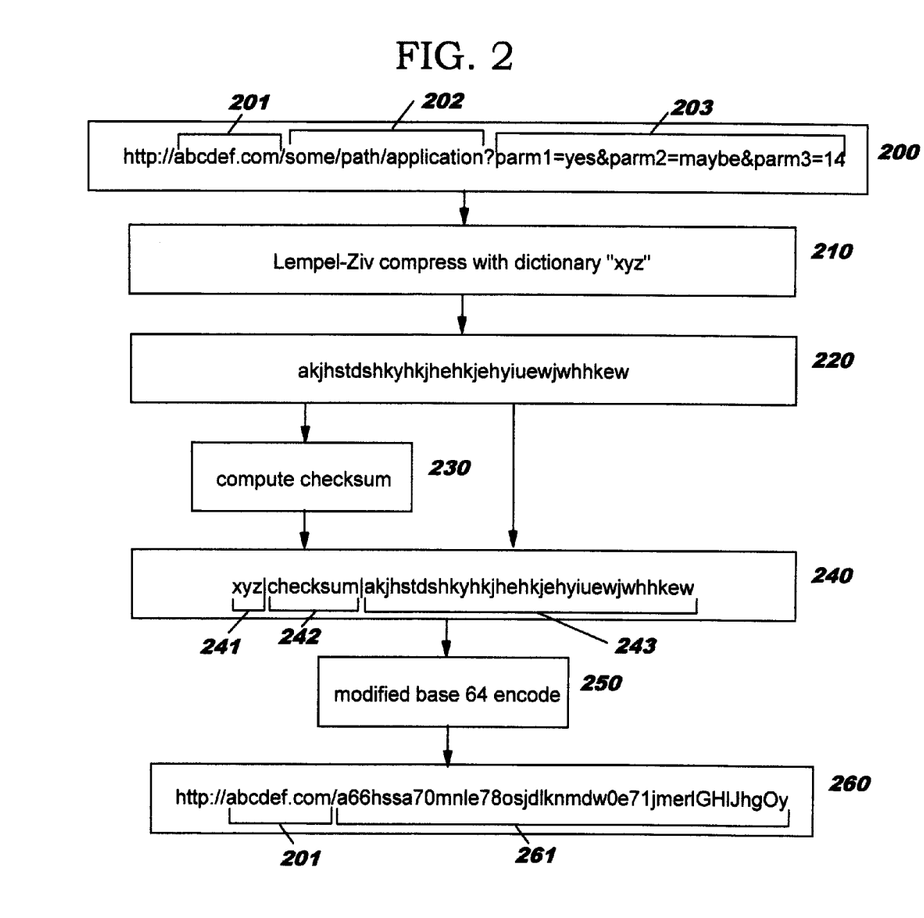
FIG. 2 illustrates how information in a URL is obscured, according to an aspect of the present invention, using a sample URL.
Figure 3:
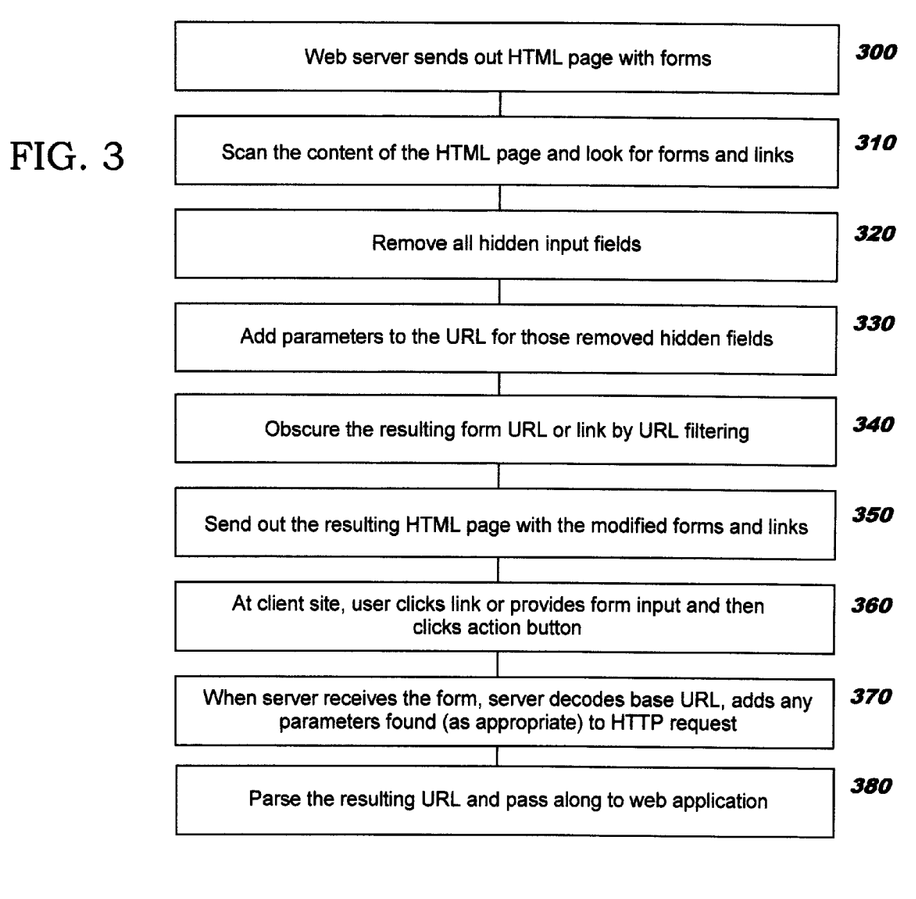
FIG. 3 provides logic which may be used for obscuring information in forms, according to another aspect of the present invention.

FIG. 2 illustrates how information in a URL is obscured, with reference to a sample URL. FIG. 3, discussed below, provides logic which may be used when obscuring information in forms.

Block 200 of FIG. 2 depicts a sample URL, where the host name portion 201 of this URL has the value "abcdef.com", the path name portion 202 (also referred to herein as a "path segment") in the example has the value "/some/path/application", and the parameter string portion 203 comprises 3 name/value pairs. In particular, the first name/value pair in the sample URL specifies a parameter name of "parm1" and a parameter value of "yes"; the second name/value pair specifies a parameter name of "parm2" and a parameter value of "maybe"; and the third name/value pair specifies a parameter name of "parm3" and a parameter value of "14".

The URL filtering process disclosed herein will use a dictionary to perform Lempel-Ziv compression on the sample outbound URL. In the example, this dictionary has an identifier of "xyz", as noted at Block 210. When the URL filtering is performed at an edge server, for example, that server determines which dictionary was prebuilt according to the approach depicted in FIG. 1 for compressing URL information from URL 200. The respective dictionary contains the initial window of symbols for this compression, and is searched for occurrences of substrings from the path segment 202 and parameter string 203.

Suppose, for example, that the log entries which were mined to create the dictionary included "parm1=" as a substring, but none of the log entries had "parm1" set to "yes". Further suppose, by way of simplification, that the prebuilt dictionary contains the following consecutive symbols: "parm1=no&parm45=Tuesday". In this case, searching the dictionary in the compression process for parameter string 203 finds that the longest match to the dictionary is the 6-symbol string "parm1=". A 2-byte value is therefore added to the compression output to represent compressing this 6-symbol string, where the 4 bits of this 2-byte value are set to "0011"B (i.e., 3 plus the previously-discussed length offset of 3) to represent the substring length and 12 bits of the 2-byte value are set to 0 (which, in this simple example, is the offset to where this 6-symbol string begins within the dictionary). Another search of the prebuilt dictionary then commences starting with the as-yet-unmatched "y" symbol from the parameter value portion of the "parm1=yes" parameter of string 203. If a substring matching at least 3 characters is found, then the substring length and offset are concatenated to the compression output value. Otherwise, an entry is added to the high-offset portion of the dictionary to represent the unmatched substring, and the length and offset of that substring are concatenated to the compression output value. This compression processing continues until all substrings of the path segment and parameter string in the outbound URL have been processed.

Following the compression at 210, a compression output result illustrated at 220 is now available. (As will be obvious to the reader, the sample string at 220 is meant to illustrate that some string value results from the compression algorithm, and is not intended as an actual result.) An error detection code—such as a checksum or hash—is computed over this compression result, as indicated at Block 230. Optionally, the error detection code may be computed as a secure hash for increased integrity. As is known in the art, a secure hash is created by encrypting a checksum with a private key. For ease of reference, the term "checksum" is used herein to refer to either a checksum or a secure hash.

The dictionary identifier, error detection code, and compression result are then concatenated to form a new string value, as illustrated at Block 240 (where the concatenation symbols "|" are provided by way of illustration only, and do not form part of the actual string). See reference numbers 241, 242, and 243, respectively.

As is known in the art, coding URL strings into hexadecimal values for transmission in messages encounters problems with the encoding of certain characters such as "+" and "/" characters. Therefore, URL strings are typically encoded with what is referred to as a modified Base64 for URL variant encoding. In this modified Base64 encoding, no padding "=" signs are used, and the "+" and "/" characters of standard Base64 encoding are replaced by "−" and "_" (that is, a dash character and an underscore character), respectively. Accordingly, modified Base64 encoding is performed on a binary representation of the concatenated string from Block 240, as noted at Block 250, for creating the obscured content 261 in the outbound URL which is illustrated at 260 of FIG. 2. This URL 260, also referred to herein as an "obscured URL", is then ready to send over the network. Note that the outbound URL 260 retains the host name portion 201 from input URL 200, in order to identify the server to which a corresponding message will be returned, and follows this with a "/" delimiter and then the obscured content 261 which has been created in the prior operations of FIG. 2. (As will be obvious to the reader, the sample string at 261 is meant to illustrate that some obscured string value results from the processing of FIG. 2, and is not intended as an actual result.)

When an inbound message containing an obscured URL is received (e.g., by a web server or site edge proxy), the obscured URL is decoded by reversing the processes applied in FIG. 2. The modified Base64 for URL variant used at Block 250 is therefore used to recover the compressed, 3-part binary string of the form illustrated in the example at Block 240. The recovered dictionary identifier 241 from this string is used to identify the dictionary to be used in decompressing the string 243. When using 16-bit values are described above, the decompressing comprises using the 4-bit length value to determine the length of data to be retrieved from the dictionary, and using the 12-bit offset value to determine where that sequence of symbols begins in the dictionary. As discussed above, the 4-bit length value is preferably modified by adding an offset of 3 in order to store substrings having lengths from 3 to 18 symbols. Once the entire compressed string has been decompressed, an error detection code is computed anew over the decompressed string and compared to the recovered error detection code 242 to verify the integrity of the decompressed string. When the values match, the original URL and its parameters have been recovered by the decompression processing, and are then available for use by the target application. If the values do not match, then it may be presumed that the parameterized URL is corrupted, and it is preferably discarded.

Turning now to FIG. 3, logic is provided which may be used when obscuring information in forms. A web server may have content to send out that includes an HTML page containing one or more forms (Block 300). In this case, an aspect of the present invention for forms processing scans the content of the HTML page, looking for forms and links embedded therein (Block 310). A link or outbound URL may be encoded as the value of an "action" attribute of an HTML form. For example, see reference number 420 of the sample HTML page 400 in FIG. 4, where the value of the action attribute identifies the recipient to which form 410 will be sent for processing.

Figure 4:
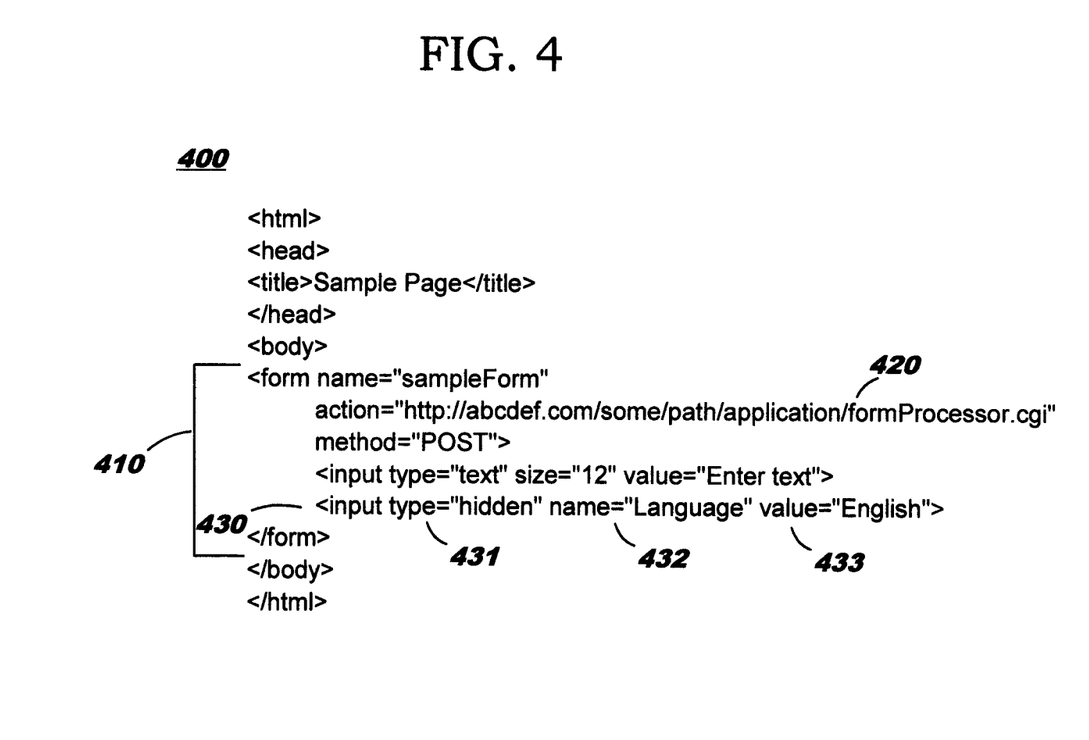
FIG. 4 provides sample syntax of a Hyptertext Markup Language ("HTML") page containing a form.

All hidden input fields are removed from the form (Block 320) and these removed hidden fields are then added as parameters to the embedded URL (Block 330). In the sample HTML page 400, this comprises removing the hidden input field 430 and building a parameter name/value pair of "Language=English" using the sample parameter name 432 and value 433. The resulting form URL or link is then obscured (Block 340), using a URL filtering process as has been described above with reference to FIG. 2. The resulting HTML page with its modified forms/links is then sent out to the target client (Block 350).

The client receiving the HTML page with the embedded form uses the form as a template for the user to provide input data for the form fields, after which the user submits the form by clicking on an action button; or, alternatively, the user may submit the form by clicking on a rewritten link (Block 360) created to represent the form data. Notably, because the hidden input fields which were removed at Block 320 would not have been displayed at the client, due to the "hidden" value for the type attribute 431, the user will not perceive any difference in the form. Once the user completes the entry of data for the form fields and submits the form by clicking on the action button or clicking a rewritten link, it is received at the server (Block 370), which recovers the values from the obscured URL using decompression (including recovering any parameters included therein) as has been discussed above with regard to recovering values from URL 260.

Because parameters may have been added to the original URL for representing hidden input fields, as discussed above with reference to Block 330, the recovery performed at Block 370 may result in finding new parameters. If the original inbound request sent from the client was a GET request and the URL from the action element contained parameters (which has not been illustrated in FIG. 4), then these parameters are added to any parameters that were decompressed, and the result is passed along in the URL to the web application (Block 380). In this manner, the hidden parameters are restored in GET action HTML forms. Or, if the original inbound request sent from the client was a PUT request and the form contained a parameter data segment, then if the parameters were decompressed with the URL, they are removed from the URL and added to the segment data before being passed upstream to the server or application for which the parameter data segment is intended (Block 380). In this manner, the hidden parameter data segments are restored on PUT action HTML forms.

It may be useful to periodically refresh the site dictionary by repeating the processing illustrated in FIG. 1, so that the dictionary symbols reflect current usage patterns at the site. The frequency of refreshing the site dictionary may be considered a trade-off between optimizing the URL length and the rate of change of parameter names and site path segments versus the size of the dictionary history, assuring that a dictionary usable with old bookmarks (that is, bookmarks stored at the client in obscured form) will remain usable into the future.

Alternative embodiments may provide the URL filtering at locations different from those which have been discussed. For example, the URL filtering might be provided in a load balancer, web proxy, web server, or edge server. Alternative embodiments may use compression techniques other than Lempel-Ziv LZSS, and the addition of 3 to the value of the length field may not be applicable to those other compression techniques.

Figure 5:
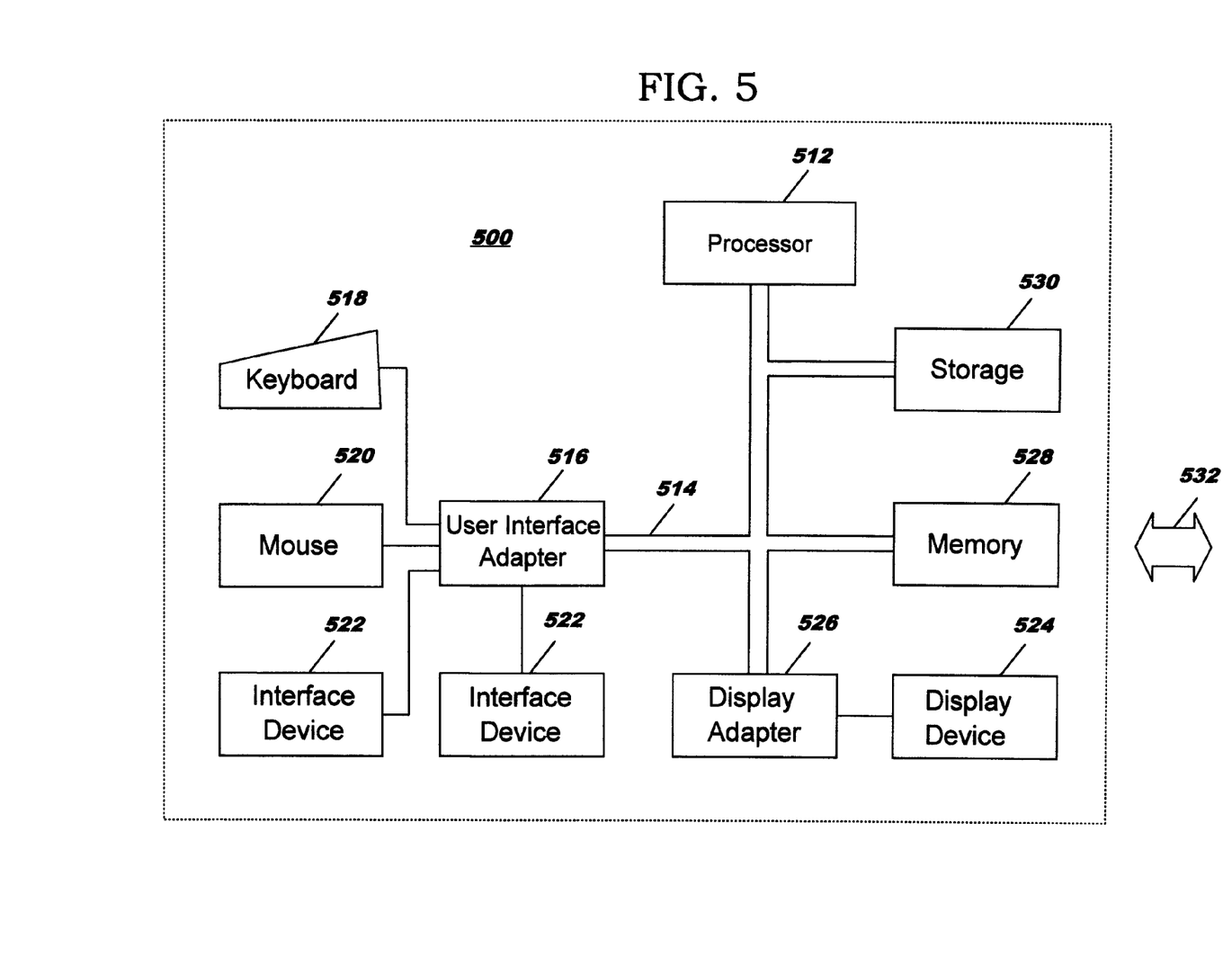
FIG. 5 depicts a data processing system suitable for storing and/or executing program code.

Referring now to FIG. 5, a data processing system 500 suitable for storing and/or executing program code includes at least one processor 512 coupled directly or indirectly to memory elements through a system bus 514. The memory elements can include local memory 528 employed during actual execution of the program code, bulk storage 530, and cache memories (not shown) which provide temporary storage of at least some program code in order to reduce the number of times code must be retrieved from bulk storage during execution.

Input/output ("I/O") devices (including but not limited to keyboards 518, displays 524, pointing devices 520, other interface devices 522, etc.) can be coupled to the system either directly or through intervening I/O controllers or adapters (516, 526).

Network adapters may also be coupled to the system to enable the data processing system to become coupled to other data processing systems or remote printers or storage devices through intervening private or public networks (as shown generally at 532). Modems, cable modem attachments, wireless adapters, and Ethernet cards are just a few of the currently-available types of network adapters.

Figure 6:
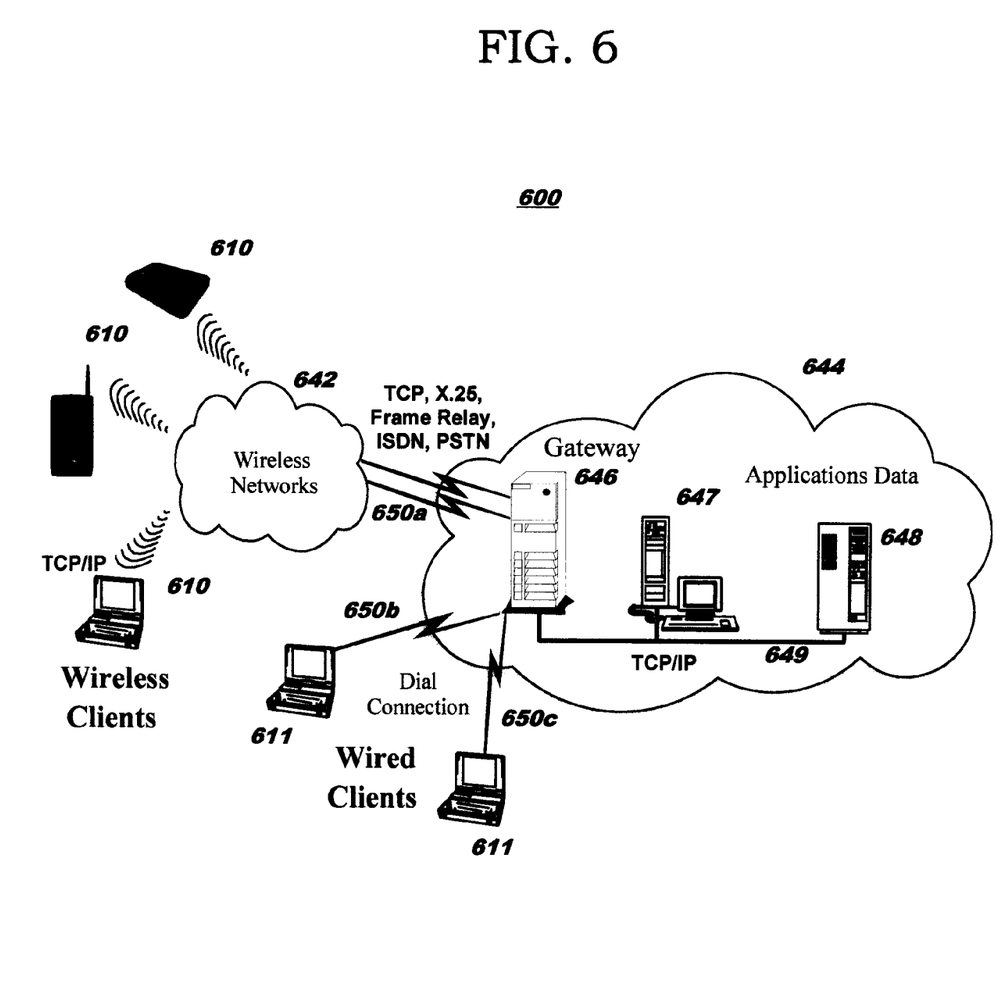
FIG. 6 depicts a representative networking environment in which one or more embodiments of the present invention may be used.

FIG. 6 illustrates a data processing network environment 600 in which the present invention may be practiced. The data processing network 600 may include a plurality of individual networks, such as wireless network 642 and wired network 644. A plurality of wireless devices 610 may communicate over wireless network 642, and a plurality of wired devices, shown in the figure (by way of illustration) as workstations 611, may communicate over network 644. Additionally, as those skilled in the art will appreciate, one or more local area networks ("LANs") may be included (not shown), where a LAN may comprise a plurality of devices coupled to a host processor.

Still referring to FIG. 6, the networks 642 and 644 may also include mainframe computers or servers, such as a gateway computer 646 or application server 647 (which may access a data repository 648). A gateway computer 646 serves as a point of entry into each network, such as network 644. The gateway 646 may be preferably coupled to another network 642 by means of a communications link 650a. The gateway 646 may also be directly coupled to one or more devices 611 using a communications link 650b, 650c, and/or may be indirectly coupled to such devices. The gateway computer 646 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 646 may also be coupled 649 to a storage device (such as data repository 648).

Those skilled in the art will appreciate that the gateway computer 646 may be located a great geographic distance from the network 642, and similarly, the devices 610a, 611a and/or other devices 610b, 611b may be located some distance from the networks 642 and 644, respectively. For example, the network 642 may be located in California, while the gateway 646 may be located in Texas, and one or more of the devices 610a may be located in Florida. The devices 610a may connect to the wireless network 642 using a networking protocol such as the Transmission Control Protocol/Internet Protocol ("TCP/IP") over a number of alternative connection media, such as cellular phone, radio frequency networks, satellite networks, etc. The wireless network 642 preferably connects to the gateway 646 using a network connection 650a such as TCP or User Datagram Protocol ("UDP") over IP, X.25, Frame Relay, Integrated Services Digital Network ("ISDN"), Public Switched Telephone Network ("PSTN"), etc. The devices 611a may connect directly to the gateway 646 using dial connections 650b or 650c. Further, the wireless network 642 and network 644 may connect to one or more other networks (not shown), in an analogous manner to that depicted in FIG. 6.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on the user's device and partly on a remote computer. The remote computer may be connected to the user's device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method for obscuring information in messages, comprising using a processor of a computer for:

comparing, for an outbound message containing at least one address string that comprises at least a path segment of a Uniform Resource Locator, each of the at least one address string to a compression dictionary to thereby locate any substring within the at least one address string that corresponds to an entry in the compression dictionary;

obscuring each of the at least one address string prior to transmission of the outbound message, comprising:
replacing, in the each address string, any located substring with the corresponding entry from the compression dictionary, thereby creating a compressed version of the address string;
computing an error detection code over the compressed version;
concatenating an identifier of the compression dictionary, the error detection code, and the compressed version, thereby creating a concatenated string; and
appending an encoding of the concatenated string to location information identifying an intended recipient for information contained within the outbound message, thereby creating an obscured version of the location information in which any replaced substring is recoverable upon subsequently receiving the outbound message as an inbound message;

scanning content of the outbound message, prior to the transmission, to locate any form embedded therein as a markup language document; and responsive to locating at least one form by the scanning, obscuring form data within the located form, comprising:
removing, from the located form, any hidden input field, each hidden input field specifying at least one parameter, and concatenating each of the at least one parameter to an embedded link of the located form; and
performing the comparing and the obscuring for the located form, wherein the location information identifies an intended recipient for information contained in the located form.

2. The method according to claim 1, wherein the comparing, the obscuring, the replacing, the computing, the concatenating, and the appending are performed using computer-readable program code executed by a computer.

3. The method according to claim 1, wherein the compression dictionary is prebuilt by analyzing log data of the intended recipient.

4. The method according to claim 3, wherein the compression dictionary comprises a sliding window of symbols representing substrings found in the log data by the analyzing.

5. The method according to claim 4, wherein the substrings found in the log data are ordered from least-often-used to most-often-used when prebuilding the compression dictionary.

6. The method according to claim 1, wherein the compression dictionary is a Lempel-Ziv compression dictionary.

7. The method according to claim 1, wherein the at least one address string further comprises a parameter string of the Uniform Resource Locator.

8. The method according to claim 1, further comprising recovering each replaced substring upon subsequently receiving the inbound message.

9. The method according to claim 8, wherein the recovering further comprises:
separating the encoding of the concatenated string from the location information identifying the intended recipient;
recovering the concatenated string from the encoding;

obtaining the identifier of the compression dictionary, the error detection code, and the compressed version from the recovered concatenated string;

using the identifier to locate the compression dictionary;

using the located compression dictionary to recover, using the corresponding entry in the obtained compressed version, any replaced substring therein, thereby creating a recovered version of the address string;

computing a new error detection code over the recovered version of the address string; and using the recovered version of the address string only if the computed new error detection code matches the error detection code obtained from the recovered concatenated string.

* * * * *